United States Patent
Sagar et al.

(10) Patent No.: US 9,927,957 B1
(45) Date of Patent: Mar. 27, 2018

(54) ROTARY NAVIGATION OF SYNCHRONIZED CONTENT

(71) Applicant: Audible, Inc., Newark, NJ (US)

(72) Inventors: Aman Sagar, Hoboken, NJ (US); Michael Angelo Macchione, III, Glen Ridge, NJ (US)

(73) Assignee: AUDIBLE, INC., Newark, NJ (US)

( * ) Notice: Subject to any disclaimer, the term of this patent is extended or adjusted under 35 U.S.C. 154(b) by 488 days.

(21) Appl. No.: 14/567,800

(22) Filed: Dec. 11, 2014

(51) Int. Cl.
| G06F 3/048 | (2013.01) |
| G06F 3/0483 | (2013.01) |
| G06F 3/0488 | (2013.01) |
| G06F 3/16 | (2006.01) |
| G06F 3/0485 | (2013.01) |

(52) U.S. Cl.
CPC .......... *G06F 3/0483* (2013.01); *G06F 3/0488* (2013.01); *G06F 3/165* (2013.01); *G06F 3/0485* (2013.01)

(58) Field of Classification Search
CPC .... G06F 3/0362; G06F 3/048–3/04886; G06F 3/167; G06F 17/30; G06F 3/011; G06F 3/017
See application file for complete search history.

(56) References Cited

U.S. PATENT DOCUMENTS

| 7,710,393 | B2 | 5/2010 | Tsuk et al. |
| 2007/0236475 | A1* | 10/2007 | Wherry ................. G06F 3/0485 345/173 |
| 2009/0228820 | A1* | 9/2009 | Kim .................... G06F 3/04817 715/769 |
| 2013/0145303 | A1* | 6/2013 | Prakash .............. G06F 3/04883 715/779 |
| 2013/0159853 | A1* | 6/2013 | Story, Jr. ................ G06F 3/165 715/716 |
| 2014/0223272 | A1* | 8/2014 | Arora ....................... G09B 5/06 715/203 |

* cited by examiner

*Primary Examiner* — Claudia Dragoescu
(74) *Attorney, Agent, or Firm* — Knobbe, Martens, Olson & Bear, LLP

(57) ABSTRACT

Embodiments of this disclosure enable synchronized content items, such as an ebook and corresponding audiobook, to be navigated via a rotational interface (e.g., a "jog wheel"). Specifically, a playback device is disclosed that enables a rotational interface to be used to select locations within an audiobook or other audio content. During selection of a location, the playback device can maintain an output indicator indicating one or more words within a textual content that match the selected location within the audio content. Thus, a user is enabled to easily and intuitively select precise locations within audio content. In some embodiments, an acceleration or speed of input to the rotational interface may modify how quickly locations within the content item are traversed.

18 Claims, 9 Drawing Sheets

ROTARY NAVIGATION OF SYNCHRONIZED CONTENT

BACKGROUND

Generally described, computing devices may present items of digital content to users for consumption. For example, computing devices may visually present items of content such as animations, electronic books, movies, television programs, multi-media content, and portions thereof on an electronic screen or touchscreen. Computing devices may also direct audible output through headphones or speakers to audibly present content such as audiobooks, songs, movies, television programs, multi-media content, and portions thereof.

In some instances, a single item of content may be available for acquisition in multiple versions or formats. For example, a novel that is originally published in physical book format may also be made available as an audiobook and an electronic book. In some instances, the same novel may also be adapted into a movie version. Where such an adaptation contains substantially similar subject matter to the novel, the adaptation can also be considered a version of the novel.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
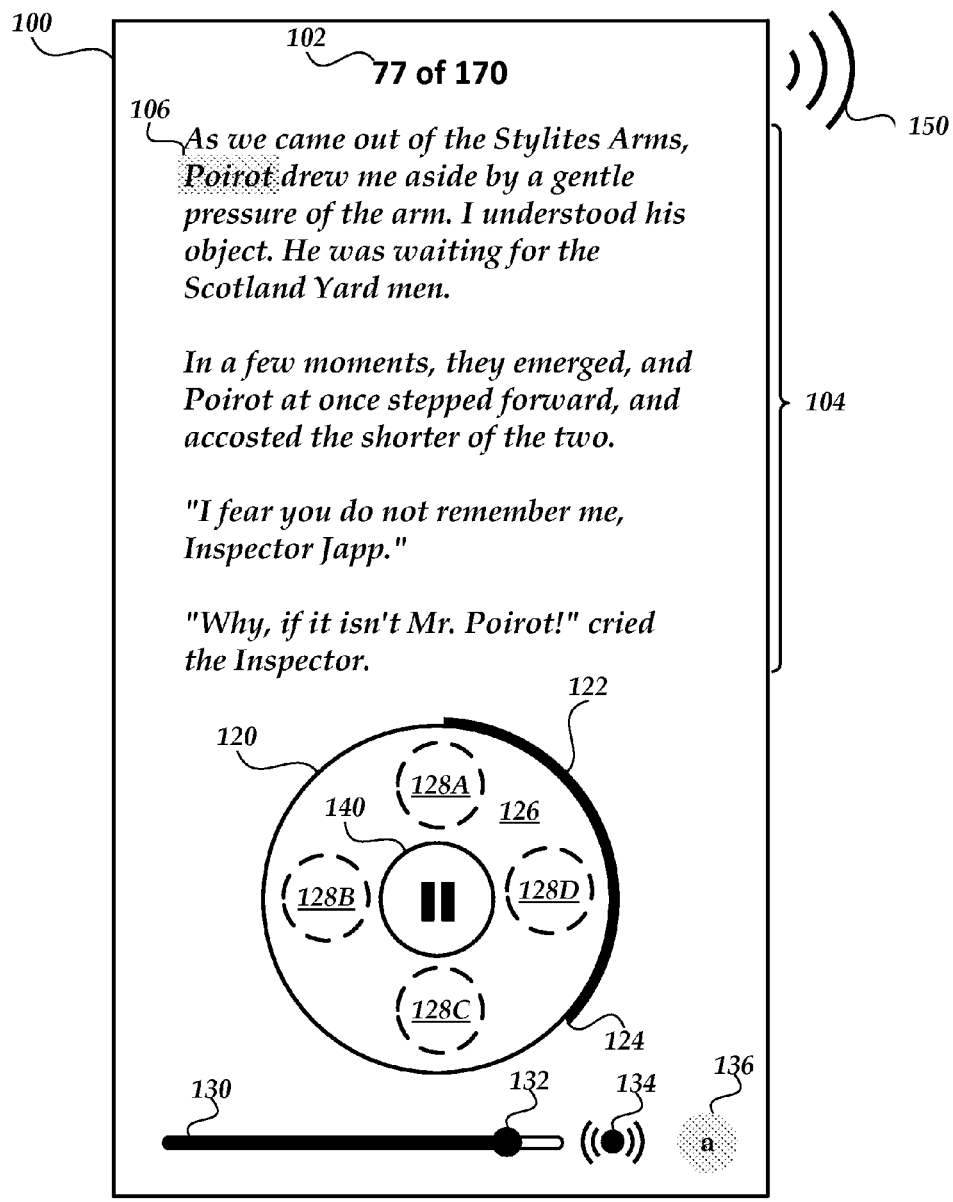
FIG. 1 is an illustrative user interface enabling rotational navigation of synchronized audio and textual versions of a content item.

Generally described, aspects of the present disclosure relate to the use of rotational input, such as touch input, to facilitate interaction with synchronized content versions or synchronized content items. For example, the present disclosure can enable navigation of an audiobook version of a content item based at least in part on an electronic book ("ebook") version of the content item synchronized to the audiobook. One embodiment of the disclosure can be implemented on a personal playback device, such as a mobile phone, that includes a touch screen input and is configured to synchronously output an audiobook and corresponding ebook version of a content item. In accordance with the present disclosure, a portion of the touch screen can implement a rotational control. A user may provide clockwise input around the rotational control in order to advance a current playback location (e.g., a location within a content item from which a portion of the content item is being output to a user) of both the audiobook and ebook versions of the content item. Similarly, the user can provide counterclockwise input to rewind the current playback location. Advantageously, because rotational interfaces enable continuous input within a fixed amount of space, the granularity or accuracy of input via a rotational interface is not limited by the space in which the interface presented. In contrast, the granularity and accuracy of traditional straight navigational bars, such as scrub bars, is directly correlated to the space in which the scrub bar is presented. Often, this characteristic of traditional scrub bars is undesirable due to limited space in which to present the bar (e.g., due to the size of the interface presented) or the manner in which a user is expected to interact with the scrub bar (e.g., by use of the thumb of the hand also holding the input device). The disclosed rotational input solves these problems by enabling accurate, high granularity navigation of content items within a fixed amount of space. Moreover, because individual points within a rotational interface are not directly correlated to a single location within a content item (as are points within a traditional scrub bar), specific characteristics of a user's interaction with the rotational interface can be used to take various actions with respect to a content item. For example, various speeds or accelerations of user input can be used to modify the speed at which a playback location is modified. Illustratively, a playback device may respond to user input under a given rotational speed threshold (e.g., as measured in rotations per second) by advancing a playback location at a first rate, and response to user input meeting or exceeding the rotational speed threshold by advancing the playback location at a second rate. Further, the playback device may interpret taps or presses on the rotational interface as distinct commands (e.g., allowing modification of playback speed, volume, playback location, etc.). Thus, the rotational interface disclosed herein can enable accurate, high granularity control over multiple aspects of content item playback.

In one embodiment, synchronization information for multiple versions of a content item, or multiple content items, can be utilized to further enhance navigation via a rotational interface. Specifically, navigation of a first version of a content item, such as an audiobook (e.g., a data file containing a narrated audio work of an underlying base content), may be enabled by a rotational interface allowing selection of a playback location within a second version of the content item, such as an ebook. For example, a user listening to an audiobook may wish to navigate to a specific playback location within the narrative of the audiobook, such as a specific word, sentence, paragraph, etc. However, traditional audiobook navigation controls generally only enable navigation to chronological playback locations (e.g., to a specific time point within the audiobook file). To address this deficiency, a rotational interface can enable navigation to playback locations within an alternative version of the audiobook, such as an ebook. Accordingly, the user may utilize the rotational interface to navigate to a specific playback location of the ebook (e.g., a specific word, sentence, paragraph, etc.). Thereafter, a playback device can determine, using synchronization information of the ebook and audiobook, a corresponding location within the audiobook. The playback device can then begin playback of the audiobook at the determined location. Thus, a user may be enabled to navigate items of dynamic content (e.g., items of content presented continuously over time, such as movies or audiobooks) via locations selected from different versions of the content item.

As noted above, embodiments of the present application can utilize synchronization information to determine corresponding locations (e.g., locations that represent identical or substantially similar subject matter) between multiple versions of a content item or multiple content items. In some instances, synchronization information may be generated during creation of the content items or versions thereof. For example, a textual transcription (e.g., subtitles) of a video content may be created directly from the video content. Thus, individual portions of the transcription may include timestamps or other references to a corresponding portion of the video content. In other instances, synchronization information may be generated separately, even when content items (or versions thereof) were created at different times or by different entities. For example, synchronization information may be created mapping points within an audiobook to corresponding points within an electronic book, even when the audiobook and electronic book were created separately (e.g., from an underlying base content, such as a novel, manuscript, physical book, etc.).

In one embodiment, synchronization information may be created manually (e.g., by a publisher of a content item, by users, or by third parties. In another embodiment, synchronization information may be created automatically or partially automatically based on locating the same or similar underlying content within two content versions. For example, an audiobook version of a content item may be transformed into text (e.g., by a text-to-speech algorithm), and thereafter compared with an ebook version of the same content item. Where the language of the audiobook version and the ebook version is the same or substantially similar, a mapping point can be created synchronizing locations within the audiobook and ebook versions. Further, when correlating different versions of a content item, mismatches can result from a number of sources, such as deletions, modifications, or insertion of new material into one of the synchronized versions. Yet both versions of the content item may include large portions the same or similar material. Accordingly, in some embodiments synchronization information may be created by detecting mismatches between two versions of a content item (or two content items) using algorithms that solve "longest common sequence" problems, an implementation of which can be found, for example, in the UNIX "diff" operation. Synchronization information can then be generated for the correlated portions of the different versions (or different content items). Where different content items or versions of a content item include small-scale modifications, the synchronization information can include an indicator that these portions include some mismatches. In some embodiments, mismatches between content items or content versions may be further processed. For example, a first content item or content version can be converted into a common format, such as text and/or phoneme. Then, an attempt can be made to match content between the content versions or content items at a small scale (e.g., at a word level). Since missing or added passages can include larger portions (e.g., whole sentences or paragraphs) that do not match, a passage mismatch score indicating the frequency of mismatches can be computed for sentences, paragraphs, and/or other units of text. For example, the passage mismatch score may represent a number and/or percentage of word mismatches for a larger portion of text (e.g., a sentence, paragraph, or page). Sequences of larger portions with similarly high mismatch frequencies compared with adjoining sequences (where "high" can be set empirically from analyzing correlation of known companion content) can be identified. These sequences may represent content that should not be synchronized between content items or versions. The high mismatch passages can be removed in either or both content items or versions, and matching can be reattempted at a smaller scale (e.g., at the word level). Metadata can be generated based on the correlation(s) to determine alignment points for the synchronization information. The metadata may also include information identifying reference points in at least one of the content items or versions at which a matching portion begins/ends.

Illustrative examples may be provided herein with reference to specific formats of a content item, such as an audiobook and ebook both corresponding to an underlying base content (e.g., a novel). However, embodiments of the present application can enable rotational navigation within a variety of content formats, independently or synchronously. For example, embodiments of the present application can enable rotational navigation within audio content (e.g., audiobooks, musical works, machine-generated speech files, etc.), video content (e.g., television programs, video clips, movies, etc.), textual content (e.g., electronic books, screenplays, scripts, librettos, transcriptions, including speech-to-text of audio content included in an item of dynamic content), or multimedia content (e.g., comprising multiple content formats, such as combined audio and video content formats).

With reference to FIG. 1, an illustrative user interface 100 enabling navigation of one or more content items via rotational input controls will be described. The user interface 100 may be implemented, for example, by the playback device 202 described with respect to FIG. 2 below. As shown in FIG. 1, the user interface 100 includes a textual content portion 104, which displays a text-based version of an item of content to a user. In the example of FIG. 1, the displayed content item is an ebook version of "The Mysterious Affair at Styles," by Agatha Christie. Further, in the example of FIG. 1, the displayed ebook is synchronized with a corresponding audiobook. Synchronization of the ebook and audiobook may utilize synchronization information mapping locations within the ebook to corresponding locations with the audiobook, and vice versa, as described above. Output of the audiobook by the playback device is visually represented by the audio output indicator 150. One of skill in the art will appreciate that the audio output indicator 150 is displayed in FIG. 1 for clarity, and may not be present within an actual user interface or viewable to a user. As shown in FIG. 1, the current playback location of the audiobook version corresponds to the text "Poirot drew me aside" within the ebook. This current playback location is visually indicated within textual content portion 104 via output indicator 106. In the illustration of FIG. 1, output indicator 106 represents a highlighting of the text corresponding to a current playback location of an audiobook. However, a current playback location may alternatively or additionally be indicated by other alterations of the text (e.g., italicizing, underlining, boxing, changing of shape or size, etc.). In some embodiments, playback locations may be associated with a set predetermined set of locations within a content item. For example, playback locations within an audio content item may correspond to individual frames of an underlying audio data file in which the audio content is encoded, or to time-stamps within the audio content file. As a further example, playback locations within a textual content may correspond to specific words within the content item (e.g., a delineated by spaces or punctuation within the content item), or to other specific text-based units, such as paragraphs, pages, chapters, headings, stanzas, sections, etc.

The user interface 100 further indicates a current playback location of the ebook via a page indicator 102. In other embodiments, the indicator 102 may depict additional or alternative information regarding the current playback location of the ebook, such as a current reference identifier, chapter, heading, stanza, section, etc. While not shown in FIG. 1, embodiments of the user interface 100 may also include an indication of a current playback location within a dynamic content item (e.g., an audiobook), which may include a depiction of a current time location (e.g., timestamp) within the dynamic content item.

In addition, the user interface 100 includes a rotational navigation control element 120 enabling a user to provide rotational input (e.g., in either a clockwise or counterclockwise manner) to control a playback location of the synchronized audiobook and ebook. Specifically, by providing rotational touch input to region 126, a user may either advance (e.g., by clockwise input) or rewind (e.g., by counterclockwise input) a playback location of the synchronized audiobook and ebook. The rotational navigation control element 120 may be also referred to as a "navigation wheel" or "jog wheel." Utilization of clockwise and counterclockwise inputs within the region 126 to control location of content items will be described in more detail with respect to FIGS. 3 and 4, below.

The region 126 may be associated with one or more subregions 128, each of which a user may also interact with to modify playback of a content item. Illustratively, the rotational navigation control element 120 may be responsive to taps or presses within each subregion 128 to cause a specific modification of playback. For example, subregion 128A may, when tapped or pressed by a user, cause the playback speed (e.g., as a multiplier of the default playback speed) of a content item to increase. Similarly, subregion 128C may, when tapped or pressed by a user, cause the playback speed of the content item to decrease. Subregion 128D may, when tapped or pressed by a user, cause the playback location of the content item to jump to a next logical location, such as the next page, chapter, section, stanza, song, etc. Subregion 128B may be responsive to taps or presses to cause the playback location to jump to a previous playback location. While shown in illustrative positions within FIG. 1, subregions 128 may occupy any position within the region 126, and may vary in size and shape from the subregions 128A-D depicted in FIG. 1. In one embodiment, subregions 128A are configurable by a user with respect to one or more of their actions, their size and shape, their position, or the input required to activate the subregion 128 (e.g., long presses, multiple taps, etc.).

In addition to region 126, the rotational navigation control element 120 may also include a play/pause button icon 140 that, when pressed or tapped, toggles the playback state of a content item between playing and paused. Still further, the rotational navigation control element 120 includes a circular progress indicator 122 indicative of a current playback location of a content item with respect to a larger segment of the content item (e.g., the current chapter, the current section, or the entirety of the content item). The circular progress indicator 122 may operate similarly to a traditional scrub bar interface, with the leading point 124 advancing during playback of the content item until a final point (shown in FIG. 1 as the top of rotational navigation control element 120) is reached. The interface 100 may enable a user to drag point 124 to modify a current playback location to a corresponding location within the larger segment of the content item represented by the circular progress indicator 122. Accordingly, an 18° change in angular position of the point 124 (e.g., 10% of a complete rotation) may result in an advancement of the current playback location of 10% of whatever larger segment of the content item is indicated by the progress indicator 122. In some embodiments, the circular progress indicator 122 may include additional elements, such as chapter marks, within the indicator 122.

The user interface 100 also includes a volume slider 130, via which a user may alter a current output volume of an audio content item by movement of the slide point 132. In the interface 100 of FIG. 1, the current output volume is indicated via volume indicator 134. Still further, the user interface 100 includes an output indicator control 136, which is selectable by a user to show or hide the output indicator 106 described above.

In some embodiments, one or more aspects of the user interface 100 may be customized to a user or a content item being output by the playback device 100. For example, a background of the user interface 100 or the region 126 may display a graphic selected in accordance with the content item (e.g., cover art corresponding to the content item) or selected based on user preferences. While not shown within FIG. 1, various similar customizations to components of the user interface 100 may be made and are contemplated within the present disclosure.

While the interface elements of FIG. 1 are described above as displayed via a touch screen input, various embodiments may utilize additional or alternative inputs and outputs of a playback device to display components of user interface 100. For example, in one embodiment, the rotational navigation control element 120 may be omitted from a primary display of the playback device, and included within a secondary touch screen. In another embodiment, the rotational navigation control element 120 may be implemented within specialized hardware (such as a physical jog wheel) included within the playback device. Thus, description of the rotational navigation control element 120 as implemented by a touch screen is intended to be illustrative in nature.

Figure 2:
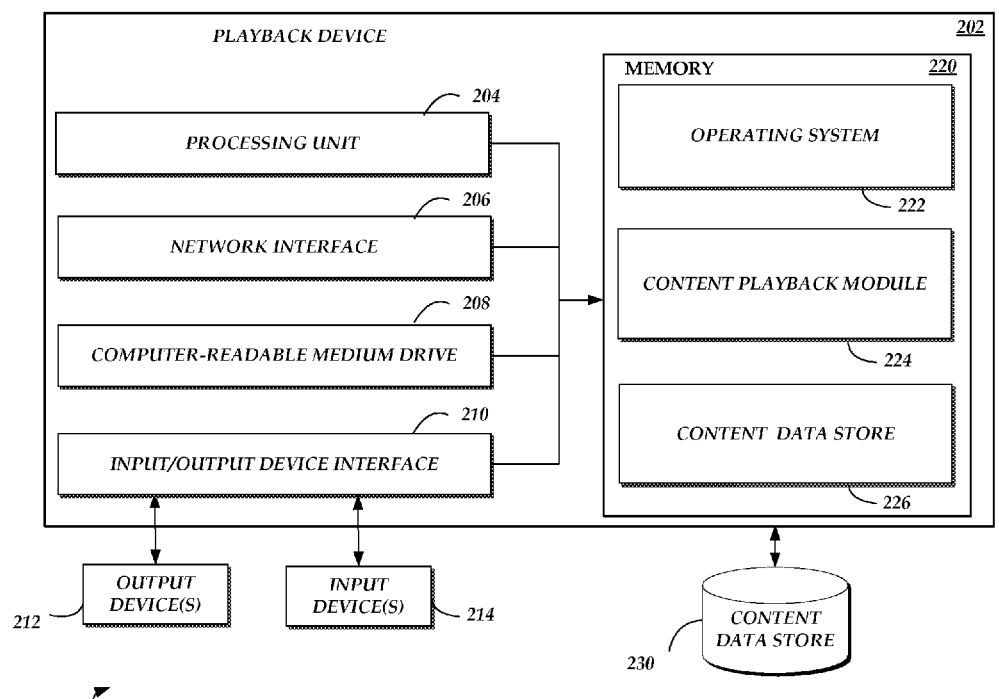
FIG. 2 is a schematic block diagram depicting an illustrative playback device enabling rotational navigation of synchronized content versions or synchronized content items.

With reference to FIG. 2, an illustrative architecture of a playback device 202 enabling rotational navigation of content items is depicted. The playback device 202 may correspond to any computing device configured to implement embodiments of the present disclosure, including (but not limited to) a laptop or tablet computer, personal computer, personal digital assistant (PDA), hybrid PDA/mobile phone, mobile phone, global positioning system (GPS) device, electronic book reader, set-top box, car stereo system head unit, wearable computing device, camera, audiobook player, digital media player, video game console, in-store kiosk, in-flight entertainment system, television, one or more processors, integrated components for inclusion in computing devices, appliances, electronic devices for inclusion in vehicles or machinery, gaming devices, or the like.

The illustrative playback device 202 depicted in FIG. 2 includes an arrangement of computer hardware and software components configured to implement aspects of the present disclosure. The playback device 202 may include more (or fewer) components than those shown in FIG. 2. As illustrated, the playback device 202 includes a processing unit 204, a network interface 206, a computer readable medium drive 208, an input/output device interface 210, one or more output devices 212, and one or more input devices 214, all of which may communicate with one another by way of a communication bus. The network interface 206 may provide connectivity to one or more networks or computing systems. The processing unit 204 may thus receive information and instructions from other computing systems or services via a network. Illustratively, the processing unit 204 may utilize the network interface 206 to receive content items, or versions of content items, for playback via the output devices 212. The processing unit 204 may further utilize the network interface 206 to transmit or receive additional information utilized by embodiments of the present disclosure, such as synchronization information mapping locations within a first content version to corresponding locations within a second content version. The processing unit 204 may also communicate to and from memory 220 and further provide output information for output devices 212 via the input/output device interface 210. Illustratively, output devices 212 may include one or more output devices capable of outputting content items to a user. Examples of output devices include, but are not limited to, speakers or any of a variety of digital or analog audio capable output ports (e.g., headphone jacks, ¼ inch jacks, XLR jacks, stereo jacks, Bluetooth links, RCA jacks, optical ports or USB ports), displays (e.g., electronic-ink, LCD, LED or OLED, CRT, projection, etc.), or haptic feedback devices (including technologies for the display of Braille or other tactile information). The input/output device interface 210 may also accept input data from one or more input devices 214. The input devices 214 may include, for example, touch interfaces (including independent touch interfaces or touch interfaces integrated into displays, commonly referred to as touch-screens), keyboards, computer mice, digital pens, motion or real-space position tracking systems (e.g., video, IR, or other visual inputs configured to track the position of a user or portions of a user), etc. For example, a touch interface may be configured to detect user contact with the interface at a variety of input coordinates on the touch interface, and to report to the processing unit 204 (or other component of the playback device 202) a set of coordinates on the touch interface at which touch input was received. A touch interface may further be configured to report a point in time at which touch input was received at each coordinate. Thus, the processing unit 204 may analyze the received coordinates and corresponding times to determine a pattern of touch input received on the touch interface. These patterns may be recognized as predefined gestures. In embodiments where one or more input devices 214 and output devices 212 are combined (e.g., within a touchscreen), the processing unit 204 may be configured to determine output position on the output devices 212 that correspond to input received via the input devices 214. For example, the processing unit 204 may be configured to determine one or more pixel positions on a touch-sensitive display that correspond to a gesture received via the touch-sensitive display.

While illustrative examples are provided herein with respect to gestures input to a touch interface, embodiments of the present application may also detect gesture made via input to alternative interfaces, such as real-space tracking systems. For example, a wearable tracking device, image sensor, or IR sensor may identify user movement at a set of coordinates in real-space. The processing unit 204 may be configured to analyze such real-space coordinates, and times corresponding to the coordinates, to determine that the user movement corresponds to a predetermined gesture. In some instances, the processing unit 204 may also be configured to determine one or more output display elements associated with the detected gesture. For example, the processing unit 204 may be configured to determine a real-space proximity between the position of user interface output on a display and the real-space coordinates at which user input is detected. As discussed below, such gestures can thereafter be used to control playback of content items in accordance with aspects of the present disclosure. Accordingly, gestures may be detected from either two or three-dimensional input devices.

The illustrative memory 220 of FIG. 2 includes computer executable instructions that the processing unit 204 executes in order to implement one or more embodiments of the present disclosure. The memory 220 can include any combination of transitory or non-transitory memory, including RAM, ROM, hard disk drives, solid state drives, flash memory, etc. The memory 220 may store an operating system 222 that provides computer program instructions for use by the processing unit 204 in the general administration and operation of the content version management system 202. Examples of operating systems for playback devices, such as personal computing devices or mobile phones, as well known within the art, and therefore will not be described in further detail herein. The memory 220 may further include computer program instructions and other information for implementing aspects of the present disclosure. For example, in one embodiment, the memory 220 includes a content playback module 224 that facilitates playback of content items, as well as user interaction to control playback of the content items. Still further, the memory 220 may include a content data store 226 storing one or more content items that may be played back on the playback device 202. The content data store 226 may also include additional information regarding the content items, such as synchronization mapping locations between multiple content items (or multiple versions of a single content item), metadata of the content item, etc. Alternatively or in addition to the internal content data store 226, the playback device 202 may be in communication with an external content data store 230. As will be appreciated by one skilled in the art, the playback device 202 may interact with the external content data store 230 to retrieve content for immediate playback (e.g., streaming) or storage within the memory 220 (e.g., for future playback).

In accordance with aspects of the present disclosure, the content playback module 224 may present one or more items of digital content, such as ebooks, audiobooks, videos, etc. to the user via the output devices 212. Further, the content playback module 224 may provide a rotational navigation control element via a set of user interfaces, such as the interfaces described below with respect to FIGS. 1 and 3-7, enabling a user to control playback of the content items. Still further, the content playback module 224 may process inputs provided by the user to the rotational navigation control element, and modify playback of the content item accordingly. Further details regarding processing of inputs to a rotational navigation control element will be described in more detail with respect to FIGS. 3-9, below.

While the playback device 202 of FIG. 2 is described herein with reference to a single device, embodiments of the present disclosure can further include one or more computing devices acting in concert to implement functionalities of the playback device 202. For example, one embodiment of the present disclosure may include a first computing device including inputs 214 and a second computing device including output devices 212, either or both of which may implement the content playback module 224. Accordingly, a user may utilize the first computing device (e.g., a mobile phone, a stereo head unit, etc.) to control playback of a content item being output on the second computing device (e.g., a television set, speaker system, etc.). Thus, embodiments of the present application may be implemented by any number of computing devices in communication with one another.

Figure 3:
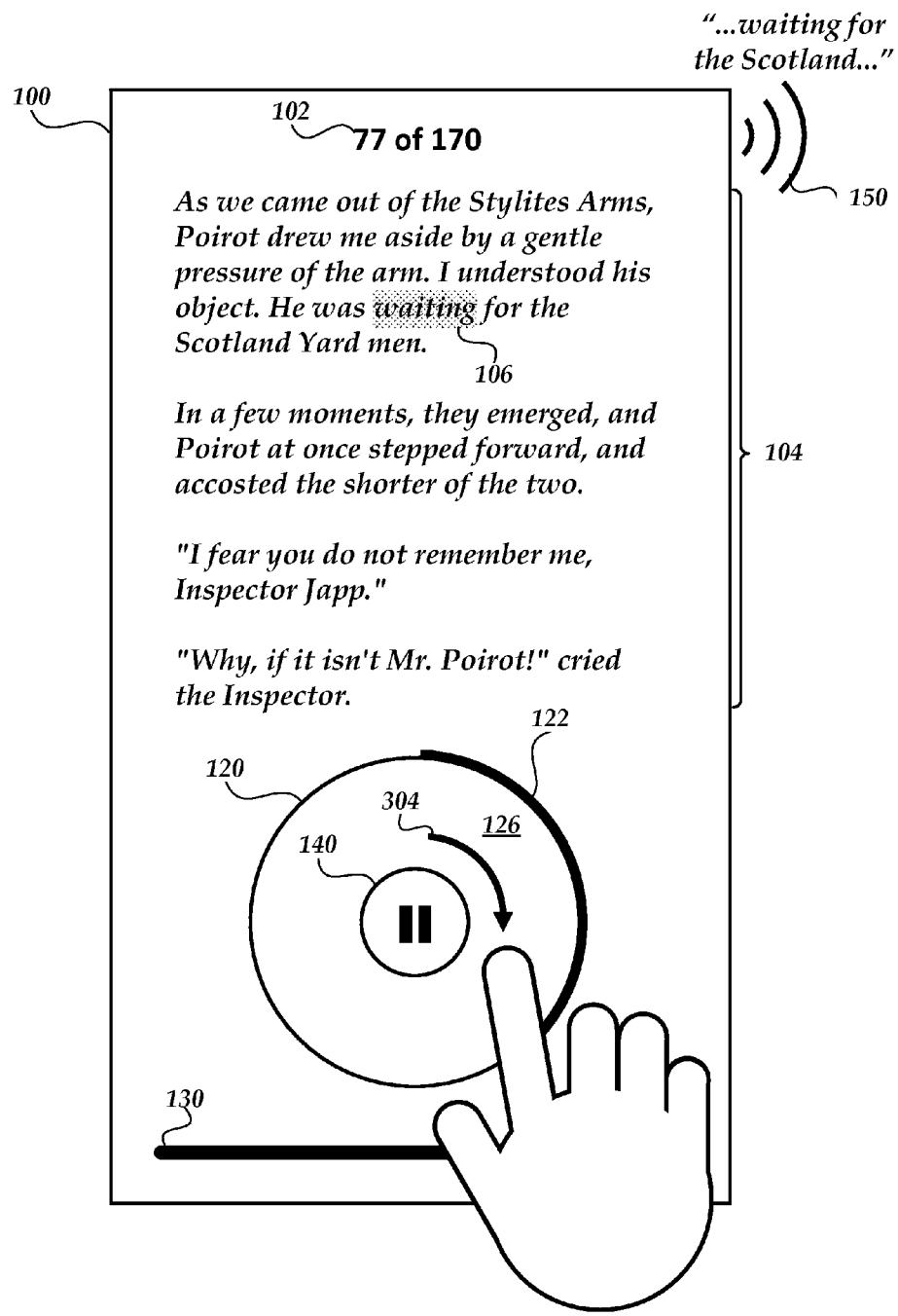
FIGS. 3 and 4 are illustrative depictions of the user interface of FIG. 1 during rotational navigation of synchronized audio and textual versions of a content item.

With reference to FIG. 3, illustrative interactions with the user interface 100 of FIG. 1 will be described. Specifically, FIG. 3 is an illustrative depiction of the use of the rotational navigation control element 120, and more specifically the region 126, to advance a playback location of an audiobook being output by a playback device 202. Within FIG. 3, it is assumed that a user has input a rotational touch input to region 126, as graphically depicted by arrow 304. Illustratively, such rotational touch input may be determined based at least in part on analyzing coordinates touched by a user on a touch interface, as well as an input time corresponding to each coordinate, to recognize that the rotational touch input corresponds to a predefined "gesture" made on a touch-sensitive display. In the example of FIG. 3, this clockwise input into region 126 advances a playback location of the currently output audiobook. Accordingly, the text of the audio output indicator 150 has been altered from that shown in FIG. 1. Similarly, the output indicator 106 has been relocated within textual content portion 104 to indicate a corresponding location within the displayed ebook.

In one embodiment, each angular distance (e.g., as measured in degrees, radians, etc.) within the region 126 corresponds to a unit of measurement within a version of the content item being output. For example, each incremental movement of 10° within the region 126 may advance a playback location of an audiobook by one second. Alternatively, each incremental movement of 10° may advance a playback location of an ebook by one word. Due to the continuous nature of rotational input 126, the granularity of the input (e.g., the amount of angular movement required to advance a playback location by one unit) may be set to a very high level, without requiring additional space in the user interface 100. Thus, the rotational navigation control element 120 solves issues of accuracy and granularity present within traditional scrub bar interfaces.

In some instances, units of location within a content item traversable by input to region 126 may not correspond directly to units of location otherwise traversable via other elements of the user interface 100 or primarily associated with a current playback mode of the playback device 202. For example, a user may utilize the user interface 100 to begin playback of an audiobook, and (through controls not shown in FIG. 1) be enabled to navigate to specific timestamp locations within the audiobook. In such an example, the region 126 may utilize non-timestamp units, such as words within an ebook corresponding to the audiobook. Accordingly, a user interacting with the region 126 may be enabled to advance the audiobook on a word-by-word (or other text-based advancement metric) basis, as opposed to second-by-second (or other time-based advancement metric).

In other embodiments, the region 126 may be associated with units of advancement enabling direct control of a playback location within a primarily output content item. For example, when playing an audiobook, the region 126 may allow second-by-second (or other time-based metric) advancement or reversal of a playback location. Thereafter, the playback device 202 can utilize synchronization information between the audiobook and a corresponding text (e.g., an ebook) to update the output indicator 106 to a relevant position on a display associated with a corresponding location within the ebook. Accordingly, the user may use the output indicator 106 to monitor the current narrative location within the audiobook, thus also enabling word-by-word (or other text-based advancement metric) basis advancement through time-based content.

In some instances, units of location within a content item traversable by interfacing with the region 126 may depend at least in part on aspects of a user's input. For example, the region 126 may use a small unit of location-based distance (e.g., a single second or word) when a user's input into the region 126 is below a threshold speed or rate of acceleration. The region 126 may use one or more progressively larger units of location-based distance as the user's input into the region 126 meets or exceeds corresponding threshold speeds or acceleration rates. Illustratively, when a user's input into region 126 is represents less than one full rotation per second, each 10° angular movement within the region 126 may advance or rewind a playback location by one second. When the user's input represents more than one full rotation per second, each 10° angular movement within the region 126 may advance or rewind a playback location by ten seconds. Further, when the user's input represents more than two full rotations per second, each 10° angular movement within the region 126 may advance or rewind a playback location by one minute. While units of location-based distance are described herein with respect to time, embodiments of the present application may also utilize text-based units, either exclusively or in combination with time-based units. For example, movement under a first threshold may cause a playback location to advance or rewind with respect to a time-based unit (e.g., seconds), while movement over the threshold may cause playback to advance or rewind with respect to a text-based unit (such as pages, chapters, etc.). Moreover, embodiments of the present disclosure may also utilize relative units in advancing or rewinding content. For example, a given amount of angular movement may result in an advancing or reversing the playback location of a content item by a percentage of the total length of the content item, the length of a currently played portion or chapter, etc.

Figure 4:
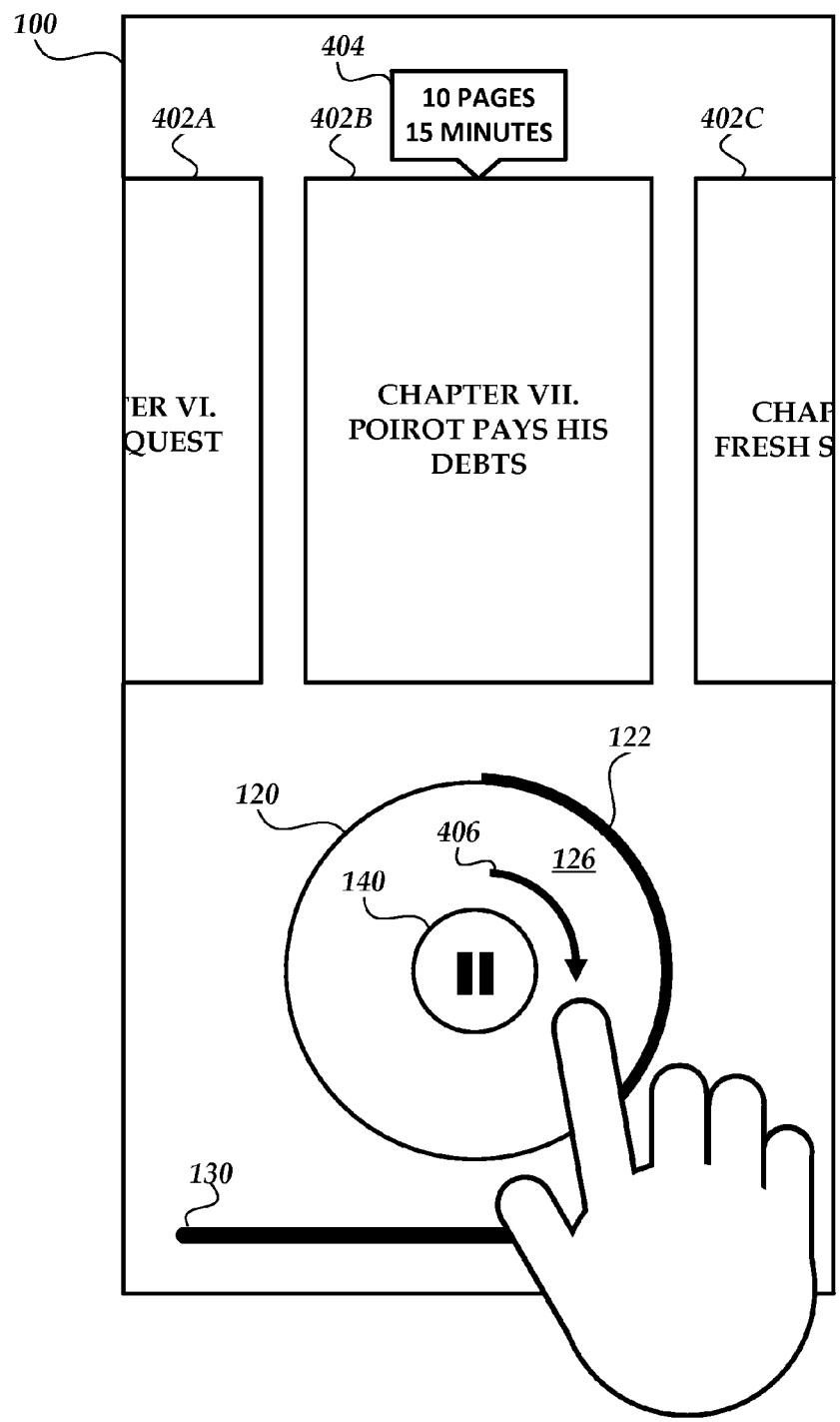

One example of an interaction with the user interface 100 to advance a content item with respect to text-based units is depicted in FIG. 4. Specifically, FIG. 4 represents an illustrative interaction with the rotational navigation control element 120 that exceeds a given threshold speed (e.g., n rotations per second), as depicted by arrow 406. As shown in FIG. 4, when the user's input exceeds the threshold speed, the user interface 100 may be modified to display text-based units of a content item. Specifically, within FIG. 4, the interface 100 has been modified to depict navigation between chapters of a content item (e.g., as represented by an audiobook and synchronized ebook). The currently selected chapter is represented by page 402B, with the previous and subsequent chapters depicted by pages 402A and 402C, respectively. Within FIG. 4, user input in a clockwise direction causes the currently selected chapter to advance (e.g., with page 402A shifting out of the interface 100, page 402B shifting to the position of page 402A, etc.). Similarly, user input in a counterclockwise direction causes the currently selected chapter to rewind (e.g., with page 402C shifting out of the interface 100, page 402B shifting to the position of page 402C, etc.). After ceasing input to the region 406, playback of the content item can begin from the selected chapter (e.g., the chapter represented by the page current centered within the interface 100). While shown with respect to chapters within FIG. 4, embodiments of the present application may also enable page-by-page or other navigation types, either additionally or alternatively to chapter-by-chapter navigation.

In some embodiments, user input sufficient to cause an increase in the location-based distance metric (e.g., a shift from second-to-second navigation to chapter-by-chapter navigation) may cause any future, continuous input to take place under the increased location-based distance metric. In this manner, a user's input falling below a given threshold value may not cause a shift in the location-based distance metric. In other embodiments, a location-based distance metric may change immediately in response to a drop in the speed or acceleration of user input. In still other embodiments, user's input may be required to exceed or drop below a threshold speed or acceleration for a specific period of time in order to cause a shift in the location-based distance metric traversable by input to the rotational navigation control element 120.

Embodiments of the present application may utilize haptic feedback to indicate to a user how a playback location of a content item is being modified. Illustratively, when input to the rotational navigation control element 120 is modifying a playback location at a relatively low rate (e.g., on a second-by-second or word-by-word basis), the playback device 202 may output a first haptic pattern as the playback location is advanced past each word within the displayed textual content. For example, with respect to FIG. 3, a haptic pattern may be output as the user movement 304 causes the output indicator 106 to advance between words of the textual content. Similarly, when the input to the rotational navigation control element 120 is modifying a playback location at a relatively higher rate (e.g., on a minute-by-minute or page-by-page basis), the playback device 202 can output a second haptic pattern as the playback location is advanced past each page within the displayed textual content. A multitude of haptic patterns can be utilized to indicate advancement of the playback location past each text-based unit (e.g., sentence, paragraph, page, chapter, etc.) within the content item.

In some instances, a user may desire to minimize or hide the rotational navigation control element 120 (e.g., to allow greater area for the textual display portion 104, to prevent accidental inputs, etc.). Accordingly, embodiments of this disclosure enable the rotational navigation control element 120 to be placed into a minimized form via interaction with the play/pause button icon 140. Specifically, in some instances, a user can be enabled to drag, flick, or otherwise move the play/pause button icon 140 up or down in order to toggle the rotational navigation control element 120 between minimized and full forms.

Figure 5:
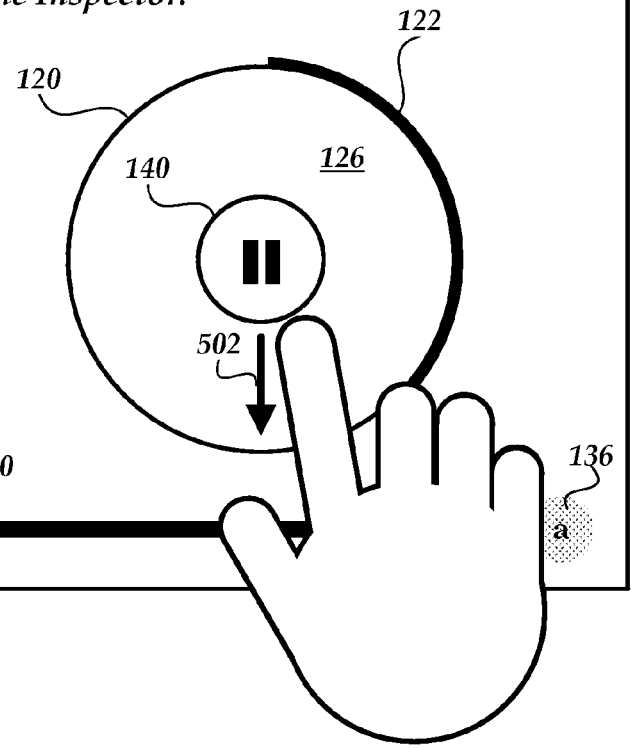
FIG. 5 is an illustrative depiction of the user interface of FIG. 1 during minimization of a set of rotational navigation inputs.
Figure 6:
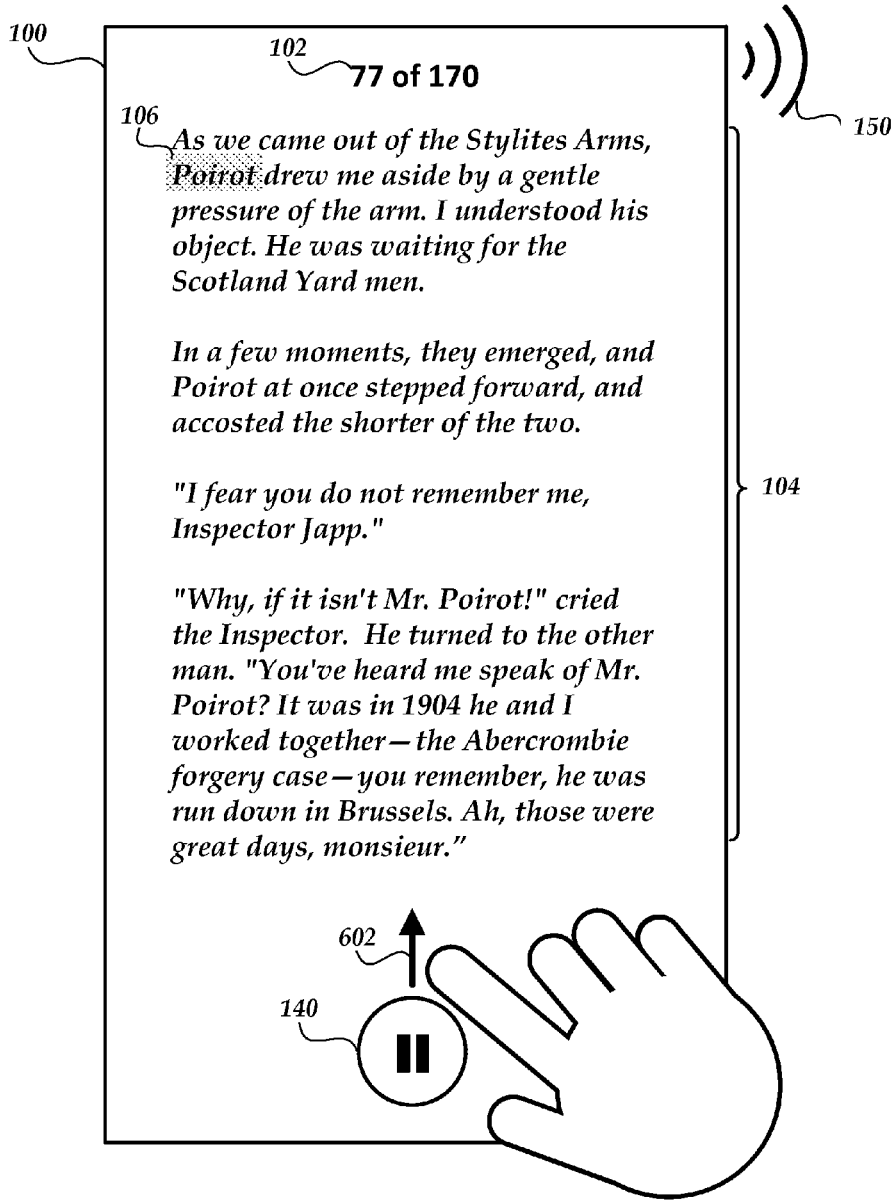
FIG. 6 is an illustrative depiction of the user interface of FIG. 1 during restoration of a set of rotational navigation inputs.

One example of interactions to minimize the rotational navigation control element 120 is shown within FIG. 5. Specifically, FIG. 5 depicts an illustrative interaction in which a user's input drags, flicks, or otherwise moves the play/pause button icon 140 in a downward direction, as visually depicted by arrow 502. Such downward movement can then cause the user interface 100 to be modified to include a minimized rotational navigation control element 120, as shown in FIG. 6. Specifically, the minimized rotational navigation control element 120 may exclude one or more portions of the interface 100, such as the region 126, the circular progress indicator 122, the volume slider 130, and the output indicator control 136. While not shown in FIGS. 5 and 6, transition of the rotational navigation control element 120 from a full to minimized state (or vice versa) may include use of one or more animations. For example, the region 126 and the circular progress indicator 122 may shrink into the play/pause button icon 140, while the volume slider 130 and the output indicator control 136 gradually fade from view.

As shown in FIG. 6, the minimized state of the rotational navigation control element 120 allows for a greater portion of the interface 100 to be dedicated to the textual content portion 104, while still enabling basic control via the play/pause button icon 140. However, should the user wish to display the full rotational navigation control element 120, the interface 100 enables the user do so by dragging, flicking, or otherwise moving the play/pause button icon 140 upward, as visually depicted by arrow 602. Thereafter, the user interface 100 can be modified in order to depict a full version of the rotational navigation control element 120, as shown, e.g., in FIGS. 2 and 5 and described in more detail above. As noted with respect to FIG. 5, transition of the rotational navigation control element 120 from a minimized to full state (or vice versa) may include use of one or more animations (not shown in FIG. 6).

Some embodiments may enable additional movements with respect to the play/pause button icon 140, not shown within FIGS. 5 and 6. For example, in some instances, flicking, dragging, or otherwise moving the play/pause button icon 140 upward while the rotational navigation control element 120 is fully displayed (e.g., in non-minimized mode) will cause the textual display portion 104 or the page indicator 102 to be removed from the interface 100, thereby moving the playback device 202 into a "listening only" mode. While textual content corresponding to a currently played audio may not be displayed in a "listening only" mode, the playback device 202 may nevertheless continue to synchronize a current audio playback location to a corresponding location in the textual content, thereby enabling the textual content to be re-displayed, in sync with the audio, at any time. In a "listening only" mode, additional information regarding a currently played audio may be displayed within the user interface (e.g., in the space previously occupied by the textual display portion 104 or the page indicator 102), such as a current playback location (e.g., timestamp) in the audio content.

Figure 7:
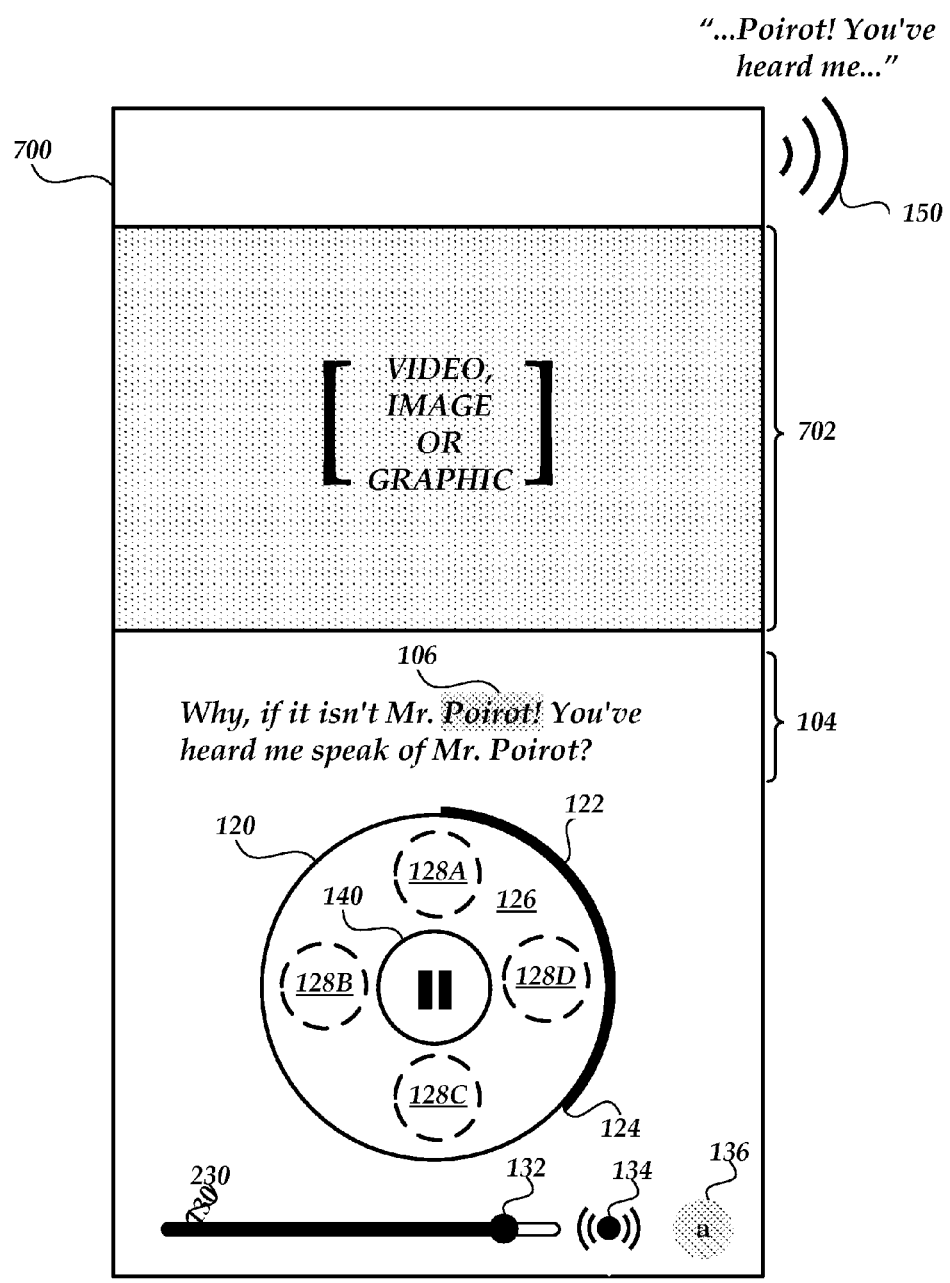
FIG. 7 is an illustrative depiction of a user interface enabling rotational navigation of an audio-visual content version of a content item and a synchronized textual version of the content item.

While embodiments above are described with respect to audio and textual contents, embodiments of the present disclosure may also enable rotational navigation of graphical contents, such as video content (e.g., as synchronized with a textual content, such as subtitles). One illustrative example of a user interface 700 enabling navigation of visual content is depicted within FIG. 7. The user interface 700 includes the rotational navigation control element 120 described above with respect to FIGS. 1 and 3-6, as well as other input controls and indicators 122-150 whose descriptions, for simplicity, will not be repeated with respect to FIG. 7. Further, the user interface 700 includes a graphical display portion 702 that depicts a graphical content, such as a video file, slideshow, illustrations, etc. The textual display portion 104 includes a set of text synchronized to the graphical display portion 702. In the example of FIG. 7, the textual display portion 104 includes subtitles corresponding to a video displayed within the graphical display portion 702. In another embodiment, the textual display portion 104 may include the text of a children's book, whose illustrations are displayed in the graphical display portion 702. In yet another embodiment, the textual display portion 104 may include commentary or discussion of slides displayed in the graphical display portion 702.

A user may utilize the rotational navigation control element 120 of FIG. 7 to navigate to locations within the graphical content displayed in graphical display portion 702.

In one embodiment, clockwise or counterclockwise motion within region 126 may cause the graphical content to be navigated according to a metric corresponding to the format in which the graphical content is presented (e.g., timestamps for video, slide number for slideshows, illustration or page number for children's books, etc.). Thereafter, the text within the textual display portion 104, as well as the output indicator 106, can be updated to correspond to a selected location within the graphical content (e.g., to display subtitles associated with a current frame and to highlight a currently spoken word). In other embodiments, clockwise or counterclockwise motion within region 126 may cause the graphical content to be navigated according to a text-based metric (e.g., on a word-by-word basis). In such embodiments, the playback device 202 may enable a user to select a specific word within the textual content, and thereafter may update a playback location of the graphical content to a corresponding location within the graphical content (e.g., via the use of synchronization information mapping locations in the graphical content to corresponding locations in the textual content). Thus, a user may interact with the rotational navigation control element 120 to navigate within a variety of content formats, including any combination of audio, text, and graphical formats.

Figure 8:
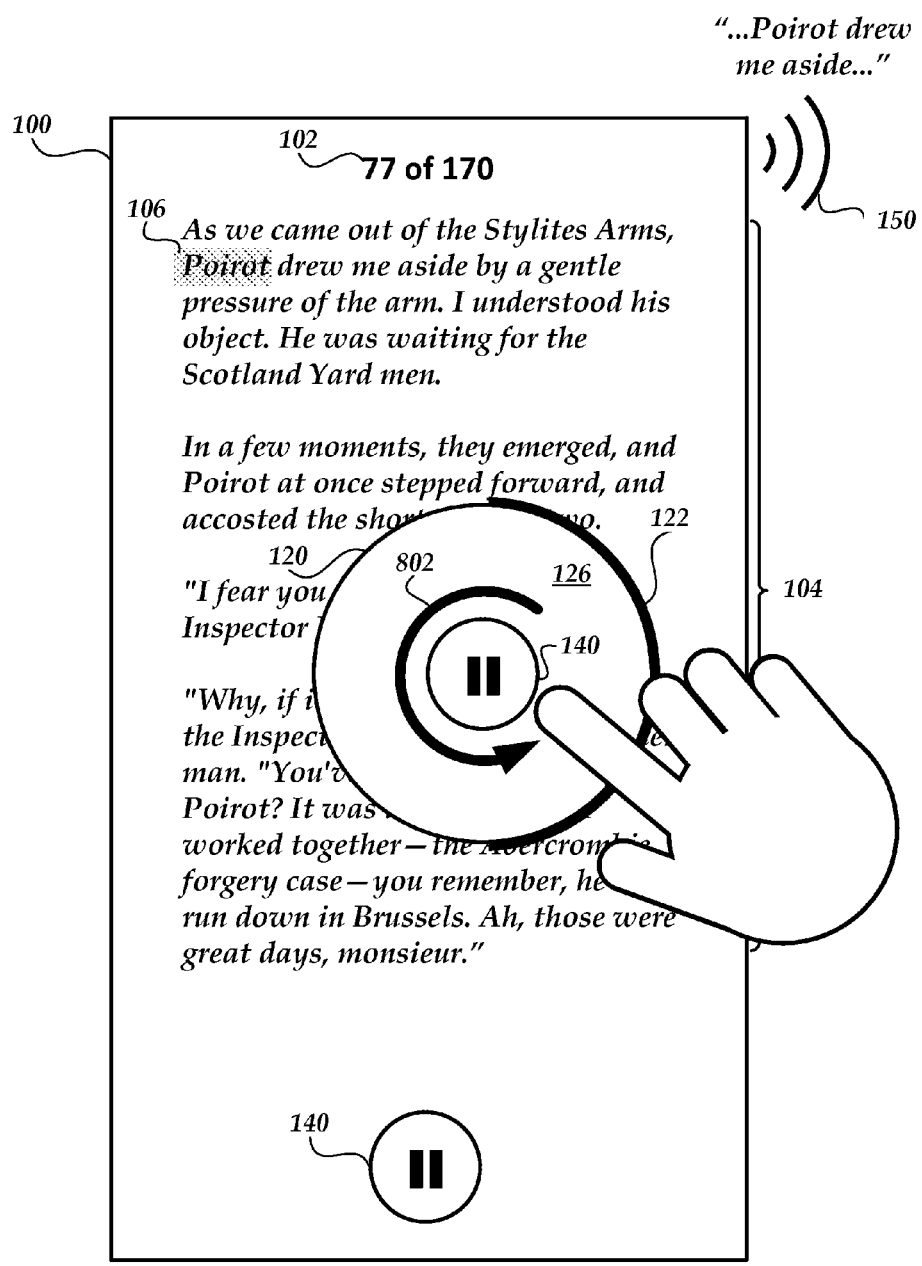
FIG. 8 is an illustrative depiction of a user interface enabling generation of rotational navigation control element at a position within the user interface indicated by user input.

Above-noted embodiments of the present disclosure enable navigation of content items via input to a rotational navigation control element 120 located at a fixed position within the user interface 100. However, in some instances, aspects of the present disclosure may also enable navigation of content items via rotational input at any point within the user interface 100. One example of such an interaction is shown within FIG. 8. Specifically, FIG. 8 depicts the user interface 100 described above with respect to FIGS. 1 and 3-6 while the rotational navigation control element 120 is in a minimized state (as described with respect to FIG. 6). Though the rotational navigation control element 120 is in a minimized state, a user may nevertheless desire to use rotational input in the manner described by the present disclosure. Accordingly, embodiments of the disclosure enable a playback device to interpret a gesture made within the textual content portion 104 (or other portions of the user interface 100) as an indicator that the rotational navigation control element 120 should be displayed at the position in the user interface 100 corresponding to coordinates at which inputs forming the gesture were received. Illustratively, such a gesture may include, but is not limited to, tapping, pressing, or hovering over points of the user interface 100 (e.g., for a predetermined period of time or in a specified pattern) or tracing a specific pattern on the user interface 100 (including a rotational input that may also serve as input to a rotational navigation control element 120). After detecting such a gesture, the user interface can generate a non-minimized rotational navigation control element 120 at position within the user interface 100 corresponding to input coordinates at which the input user input was received, thus enabling a user to utilize rotational input at any point within the user interface 100.

While the interactions of FIG. 8 describe location-independent use of the rotational navigation control element 120 when a fixed-location instance of the rotational navigation control element 120 is in a minimized state, location-independent use of the rotational navigation control element 120 may also be enabled under other conditions. For example, location-independent use of the rotational navigation control element 120 may be desired in instances where a user is unable or unexpected to view the input device through which the rotational input is made. Illustratively, location-independent use of the rotational navigation control element 120 may be desirable within a car stereo system or personal wearable computer, to enable a user to control playback of audiobooks or other audio via rotational input at any point on a touch screen, without requiring the user to view the touch screen. Location-independent use of the rotational navigation control element 120 may also be desirable in instances where a given input device can be dedicated to receiving rotational input (e.g., a separate input device). Such instances may also utilize additional or alternative gestures, such as enabling toggling of a play/pause state via a multi-touch (e.g., two-finger touch), to allow greater control over the playback device 202 without requiring view of the playback device 202 by the user. Thus, embodiments of the present disclosure can enable rotational navigation of content items within a variety of contexts and environments.

While not shown within FIG. 8, embodiments of the present disclosure can further enable the use of rotational input to navigate a content item independent from the rotational navigation control element 120. Illustratively, the playback device 202 may be configured to interpret rotational input at any point within the user interface 100 (or at specific points, such as within the textual display portion 104) as a request to navigate a content item via rotational input. Accordingly, a clockwise gesture made within the textual content portion 104 may serve to advance a current playback location, while a counterclockwise gesture within the textual content portion 104 may serve to rewind from the current playback location. In some instances, no visual indication may be provided to assist the user in making circular or near-circular gestures. However, the use of angular movement can ensure predictable navigation within a content item regardless of the shape of a user's gesture. To protect against inadvertent gestures, some embodiments may require that the user's input satisfy a threshold value (e.g., in total angular movement, in total rotations, or in circular uniformity) to enable rotational input outside of the rotational navigation control element 120.

Figure 9:
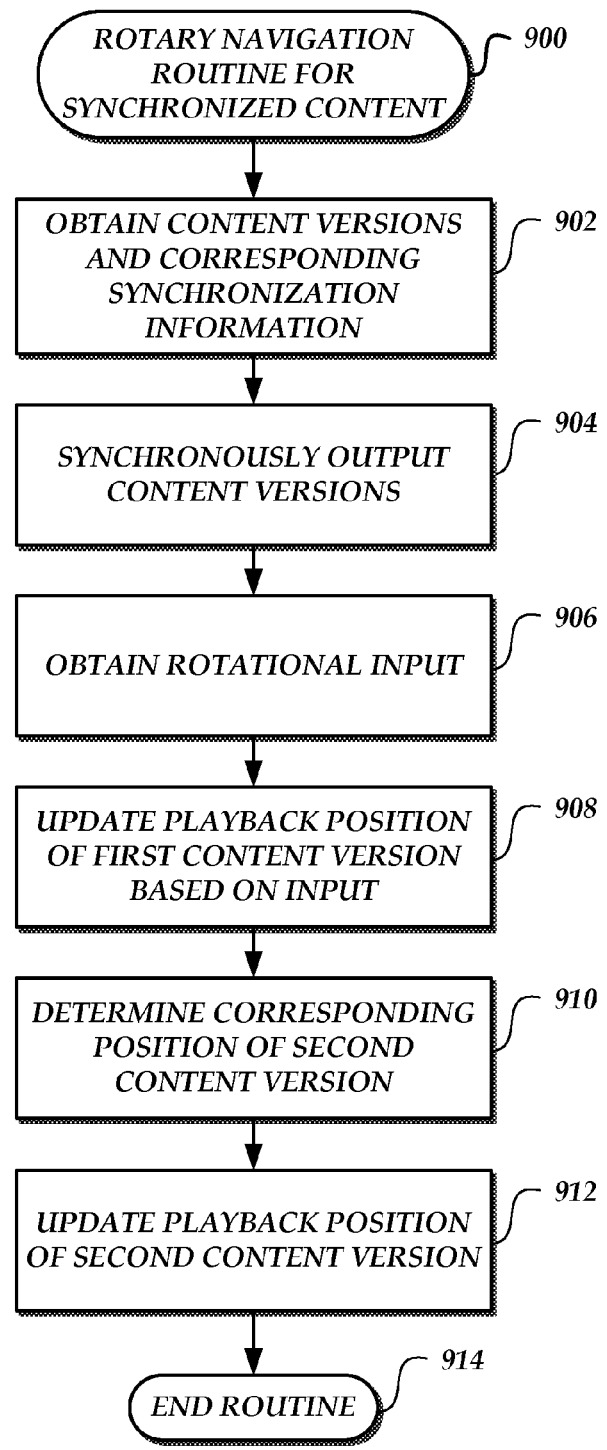
FIG. 9 is flow diagram depicting an illustrative routine enabling rotational navigation of synchronized content versions or synchronized content items.

With reference to FIG. 9, one example of a routine 900 to enable rotational navigation within synchronized content items will be described. The routine 900 may be carried out, for example, by the playback device 202 of FIG. 2. The routine 900 begins at block 902, where the playback device 202 obtains multiple versions of a content item, or multiple content items, for synchronous presentation. For example, the playback device 202 can obtain an audiobook version of a novel, as well as an ebook version of the novel. As a further example, the playback device 202 can obtain a first content item, such as a movie, as well as a second content item, such as a collection of information regarding the movie. The playback device 202 further obtains synchronization information mapping locations within the first version of the content item to corresponding locations within the second version of the content item, or mapping locations within a first content item to corresponding locations within the second content item.

Thereafter, at block 904, the playback device 202 begins to synchronously output portions of the obtained content items or versions (e.g., by utilizing the synchronization information). For example, the playback device 202 may output a portion of audio of a first version of the content item (e.g., the audio of a movie or audiobook), while simultaneously outputting a portion of text of a second version of the content item (e.g., subtitles corresponding to a movie, text of an ebook corresponding to the audiobook, etc.). In some embodiments, the playback device 202 may also display within the text an output indicator, which visually indicates a current playback location within the first version of the content item. For example, the playback device 202 may highlight one or more displayed words as corresponding words are read aloud within the audiobook. Thus, a user viewing the playback device 202 may follow the words spoken within the audio version.

At block 906, the playback device 202 can obtain rotational input from the user. In one embodiment, the rotational input may be obtained through a touchscreen or other touch-sensitive display. As described above, such a touchscreen may be configured to determine a plurality of coordinates on the touchscreen, as well as corresponding input times, at which user input has been received. Thus, in one embodiment, obtaining rotational input may include analyzing data received from a touchscreen to determine a gesture made by the user on the touchscreen. In some embodiments, the playback device 202 may be configured to determine that the rotational input was received at a coordinate of a display corresponding to output of a rotational navigation control element, as described above with respect to FIGS. 1 and 3-8. In another embodiment, the rotational input may be obtained independent of a rotational navigation control element (e.g., as a gesture on a touchscreen at a coordinate associated with text or other display elements).

At block 908, the playback device 202 modifies the playback location of the first version of the content item based at least in part on the rotational input. As noted above, the modified playback location may be determined based at least in part on an angular movement of the rotational input (e.g., as measured in degrees, radians, rotations, etc.). For example, a specific unit of angular movement may be associated with a location-based distance unit within a currently presented version of the content item. Thus, a 10° rotational input may serve to advance a playback location of the first version by one second, one word, etc. In some embodiments, a location-based unit of distance may be determined based at least in part on a speed or acceleration of the rotational input. For example, rotational input of one rotation per second or less may advance a playback location at a rate of one second per 10° rotational input, while rotational input of more than one rotation per second may advance a playback location at a rate of ten seconds per 10° rotational input.

Thereafter, at block 910, the playback device 202 determines a location with the second version of the content item corresponding to the modified playback location of the first version. For example, the playback device 202 may determine a location within an ebook corresponding to a modified playback location of an audiobook. The determined location may be based, illustratively, on synchronization information mapping locations with the first content version to corresponding locations within the second content version, as described above. Accordingly, the playback device 202 may analyze a set of synchronization information to locate a reference, within the synchronization information, to the playback location of the first version as modified within block 908. The playback device 202 may further identify, within the synchronization information, a mapping of the modified playback location of the first version to a corresponding location within the second version, thus determining the location with the second version corresponding to the modified playback location of the first version.

At block 912, the playback device 202 updates a playback location of the second content version to match the determined location (corresponding to the modified playback location of the first content version). For example, the playback device 202 may update a location of an ebook to match a selected location within an audiobook. In some embodiments, the playback device 202 may also update an output indicator within the second content version to indicate the modified playback location of the first content version. For example, the playback device 202 may highlight a specific word in an ebook corresponding to a currently spoken word within a corresponding audiobook. Thereafter, the playback device 202 can begin output of the synchronized content items (or versions thereof) from the updated playback locations of each content version.

In one embodiment, blocks 908 through 912 may occur while the rotational input is ongoing, such that a user does not need to cease input to modify the playback location. Thus, a user may utilize rotational input to accurately select a specific location within synchronized content items (or versions thereof), such as a specific word spoken within an audiobook or movie.

Many of the operations of the content navigation service are sufficiently mathematically or technically complex that one or more computing devices may be necessary to carry them out. For example, synchronizing textual content with dynamic content, transcribing digital audio to text, accessing and displaying content pages over a network and other operations of the content navigation service effectively require resort to one or more computing devices. Additionally, a computing device may be required to present an item of digital content, as discussed above.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y, and Z" unless specifically stated otherwise, is otherwise understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
    an electronic data store configured to store:
        an audiobook version of a content item; and
        an electronic book version of the content item;
    a touchscreen comprising an electronic display enabling touch input to the electronic display; and
    a computing device in communication with the electronic data store and touch screen, the computing device configured to:
        output a first portion of audio content associated with the audiobook;
        generate, for display on the touchscreen, a user interface including a first portion of text content associated with the electronic book, wherein the user interface includes an output indicator indicating text, within the text content, that corresponds to the first portion of the audio content;
        receive a first touch input data associated with a first set of coordinates on the touchscreen, wherein a first coordinate of the first set of coordinates is associated with a first time at which input was received at the first coordinate;
        determine, based at least in part on the first coordinate of the first set of coordinates and the first time associated with the first coordinate of the first set of coordinates, that the first touch input data corresponds to a predefined gesture associated with causing display of a rotational navigation control element;
        generate, for display on the touchscreen, the rotational navigation control element;
        receive a second touch input data from the touchscreen at a second set of coordinates on the touchscreen, wherein a second coordinate of the second set of coordinates is associated with a second time at which input was received at the second coordinate;
        determine, based at least in part on the second coordinate of the second set of coordinates and the second time associated with the second coordinate of the second set of coordinates, that the second touch input data corresponds to a rotational input to the portion of the touchscreen displaying the rotational navigation control display element, the rotational input representing a request to move the output indicator to locate a specific word within the text content of the electronic book and further representing a request to navigate, in the audio content, to a location corresponding to the specific word within the text content;
        display the output indicator at the specific word within the text content of the electronic book;
        determine a time position in the audio content associated with the audiobook that corresponds to the specific word within the text content of the electronic book; and
        output a second portion of the audio content from the time position.

2. The system of claim 1, wherein the computing device is further configured to determine an angular distance represented by the second set of coordinates, wherein the angular distance is associated with a predetermined number of words within the text content, and wherein the computing device is further configured to determine the specific word within the text content of the electronic book based at least in part on incrementing a location of the output indicator by the predetermined number of words.

3. The system of claim 1, wherein the computing device is further configured to display an icon on the touchscreen responsive to the predefined gesture to display the rotational navigation control element, and wherein the first touch input data is received at least in part at a coordinate on the touch screen corresponding to the icon.

4. The system of claim 1, wherein the computing device is configured to determine that the first touch input data corresponds to the predefined gesture associated with causing display of the rotational navigation control element based at least in part on identifying from the first touch input data a touch event beginning at a starting coordinate associated with an edge of the touchscreen and ending at an ending coordinate nearer to a center of the touch screen than the beginning coordinate.

5. A computer-implemented method comprising:
    as implemented by one or more computing devices configured with specific computer-executable instructions,
        outputting a portion of an audio content item synchronously with a portion of a textual content item;
        generating, within the portion of the textual content item, an output indicator indicating a location within the portion of the textual content item that corresponds to a current output position within the portion of the audio content item;
        receiving first data from an input device;
        determining the first data corresponds to a predefined gesture to cause display of a rotational navigation control element on a display device;
        displaying the rotational navigation control element using the display device;
        receiving second data from the input device, the second data representing a rotational input associated with the rotational navigation control, the rotational input representing a request to navigate the textual content item, using the output indicator, to locate a specific word within the textual content item and further representing a request to navigate, in the audio content item, to a location corresponding to the specific word within the textual content item;
        displaying the output indicator at the third location specific word within the second textual content item;
        outputting a second portion of the audio content item from a location in the audio content item that corresponds to the specific word within textual content item located using the rotational input.

6. The computer-implemented method of claim 5 further comprising outputting haptic feedback in response to displaying the output indicator at the location specific word within the second content item.

7. The computer-implemented method of claim 5, wherein the rotational navigation control element includes a circular progress indicator reflective of progress through a predetermined portion of the audio content item, and wherein the circular progress indicator is selectable to indicate a location within the audio content item and cause output of a portion of the audio content item corresponding to the indicated location in response to selection.

8. The computer-implemented method of claim 5 further comprising outputting an additional portion of the textual content item beginning at the specific word within textual content item.

9. The computer-implemented method of claim 5 further comprising determining the specific word within the textual content item based at least in part on:
   determining an angular distance represented by the rotational input, wherein the angular distance represented by the rotational input is associated with a predetermined distance within the audio content item;
   incrementing a current output location of the audio content by the predetermined distance to result in a second location within the audio content item; and
   identifying, as the specific word, a word of the textual content item that corresponds to the second location within the audio content item.

10. The computer-implemented method of claim 9, wherein the predetermined distance corresponds to at least one of a distance within the audio content item associated with a predetermined period of time or a distance within the first content item associated with a predetermined unit of text.

11. The computer-implemented method of claim 10, wherein the predetermined unit of text comprises at least one of a character, a word, a sentence, a paragraph, a chapter, a stanza, a section, or a heading.

12. The computer-implemented method of claim 5, wherein the computer-implemented method is carried out by a playback device comprising at least one of a personal computing device, a personal audio player, a mobile telephone, a tablet computing device, a car stereo head unit, an in-flight entertainment system, or a wearable computing device.

13. A device comprising one or more processors configured to perform operations comprising:
   outputting a portion of an audio content item synchronously with a portion of a textual content item;
   generating an output indicator within the portion of the textual content item, the output indicator identifying a location within the portion of the textual content item corresponding to the portion of the audio content item;
   receiving first data from an input device;
   determining that the first data corresponds to a predefined gesture to cause display of a rotational navigation control element;
   displaying the rotational navigation control element;
   receiving second data from the input device, where the second data represents a rotational input associated with the rotational navigation control, the rotational input representing a request to navigate the text of the textual content item, using the output indicator, to locate a specific word within the textual content item and further representing a request to navigate, in the audio content item, to a location corresponding to the specific word within the textual content item;
   displaying the output indicator at the specific word within the textual content item; and
   outputting a second portion of the audio content item from a location in the audio content item that corresponds to the specific word within textual content item.

14. The non-transitory computer-readable medium of claim 13, wherein the second content item comprises at least one of an electronic book, subtitles, or comments.

15. The non-transitory computer-readable medium of claim 13, wherein the rotational navigation control element is generated on a display device at a coordinate corresponding to the first data received from the input device.

16. The non-transitory computer-readable medium of claim 13, wherein the rotational navigation control element is selectable to move the rotational navigation control element within a user interface.

17. The non-transitory computer-readable medium of claim 13, wherein the operations further comprise minimizing the rotational navigation control element in response to selection of the rotational navigation control element, wherein minimizing the rotational navigation control element includes removing one or more selectable elements of the rotational navigation control element from the user interface.

18. The non-transitory computer-readable medium of claim 13, further comprising determining the specific word within the textual content item based at least in part on:
   determining an angular distance represented by the rotational input, wherein the angular distance represented by the rotational input is associated with a predetermined distance within the content item; and
   incrementing, by the predetermined distance, a current output location of the audio content to a second location within the audio content item; and
   identifying, as the specific word, a word of the textual content item that corresponds to the second location within the audio content item.

* * * * *

UNITED STATES PATENT AND TRADEMARK OFFICE
CERTIFICATE OF CORRECTION

PATENT NO. : 9,927,957 B1
APPLICATION NO. : 14/567800
DATED : March 27, 2018
INVENTOR(S) : Aman Sagar et al.

It is certified that error appears in the above-identified patent and that said Letters Patent is hereby corrected as shown below:

In the Claims

In Column 18 at Line 50, In Claim 5, after "the" delete "third location".

In Column 18 at Line 51, In Claim 5, after "the" delete "second".

In Column 18 at Line 58, In Claim 6, after "the" delete "location".

In Column 20 at Line 15, In Claim 14, change "non-transitory computer-readble medium" to --device--.

In Column 20 at Line 18, In Claim 15, change "non-transitory computer-readble medium" to --device--.

In Column 20 at Line 22, In Claim 16, change "non-transitory computer-readble medium" to --device--.

In Column 20 at Line 26, In Claim 17, change "non-transitory computer-readble medium" to --device--.

In Column 20 at Line 34, In Claim 18, change "non-transitory computer-readble medium" to --device--.

In Column 20 at Line 35, In Claim 18, change "13," to --13--.

Signed and Sealed this
Eleventh Day of December, 2018

Andrei Iancu
*Director of the United States Patent and Trademark Office*